United States Patent
Ishikawa et al.

(10) Patent No.: US 7,501,201 B2
(45) Date of Patent: Mar. 10, 2009

(54) BATTERY AND METHOD FOR MANUFACTURING SPIRAL ELECTRODE GROUP FOR USE THEREIN

(75) Inventors: Teruhisa Ishikawa, Kadoma (JP); Yoshiki Osawa, Suita (JP); Mitsuru Funaki, Moriguchi (JP); Tomonori Nakaguchi, Hirakata (JP); Junya Nishimori, Takatsuki (JP)

(73) Assignee: Panasonic Corporation, Osaka (JP)

( * ) Notice: Subject to any disclaimer, the term of this patent is extended or adjusted under 35 U.S.C. 154(b) by 787 days.

(21) Appl. No.: 10/506,609

(22) PCT Filed: Mar. 11, 2003

(86) PCT No.: PCT/JP03/02878

§ 371 (c)(1),
(2), (4) Date: Sep. 10, 2004

(87) PCT Pub. No.: WO03/077346

PCT Pub. Date: Sep. 18, 2003

(65) Prior Publication Data
US 2005/0123824 A1   Jun. 9, 2005

(30) Foreign Application Priority Data

Mar. 13, 2002 (JP) ............................. 2002-068153
Feb. 17, 2003 (JP) ............................. 2003-038090

(51) Int. Cl.
*H01M 6/12* (2006.01)
*H01M 6/46* (2006.01)
*H01M 6/00* (2006.01)
*H01M 10/00* (2006.01)
*H01M 4/82* (2006.01)

(52) U.S. Cl. ....................... 429/162; 429/122; 29/623.1

(58) Field of Classification Search ................. 429/162, 429/122; 29/623.1
See application file for complete search history.

(56) References Cited

U.S. PATENT DOCUMENTS

| 5,658,683 | A  | * | 8/1997  | Kageyama et al. | ............ 429/94 |
| 6,190,794 | B1 | * | 2/2001  | Wyser           | ............ 429/94 |
| 6,461,759 | B1 | * | 10/2002 | Miller et al.   | ............ 429/94 |

(Continued)

FOREIGN PATENT DOCUMENTS

EP   1102342   5/2001

(Continued)

OTHER PUBLICATIONS

English language Abstract of JP6-96801.

(Continued)

*Primary Examiner*—Patrick Ryan
*Assistant Examiner*—Julian Mercado
(74) *Attorney, Agent, or Firm*—Greenblum & Bernstein, P.L.C.

(57) ABSTRACT

A wound electrode group includes an electrode stack that is formed by laminating a strip of positive electrode plate, a strip of negative electrode plate, and a pair of separators interposed therebetween. When the electrode stack is wound, a difference L in length between an inner turn and an adjacent outer turn satisfies $L=2t\pi+(W \times k)$, where t is a thickness of the electrode stack, W is a maximum diameter of a cross section of the wound electrode group, and k is a coefficient that is preset in accordance with expansion coefficients of active materials of the positive and negative electrode plates and is within a range from 0.005 to 0.05.

7 Claims, 8 Drawing Sheets

U.S. PATENT DOCUMENTS

| | | |
|---|---|---|
| 6,509,114 B1 | 1/2003 | Nakai et al. |
| 6,692,542 B1 | 2/2004 | Kashiyama et al. |
| 2004/0048147 A1 | 3/2004 | Muraoka et al. |
| 2004/0061476 A1 | 4/2004 | Nakamaru et al. |

FOREIGN PATENT DOCUMENTS

| | | |
|---|---|---|
| JP | 60-180071 | 9/1985 |
| JP | 6-96801 | 4/1994 |
| JP | 07-134984 | 5/1995 |
| JP | 8-171917 | 7/1996 |
| JP | 09-283178 | 10/1997 |
| JP | 10-064577 | 3/1998 |
| JP | 10-302827 | 11/1998 |
| JP | 11-121044 | 4/1999 |
| JP | 2001-143762 | 5/2001 |
| JP | 2001-283894 | 10/2001 |

OTHER PUBLICATIONS

English language Abstract of JP 8-171917.
English language Abstract of JP 10-302827.
English language Abstract of JP 10-064577.
English language Abstract of JP 60-180071.
English language Abstract of JP 11-121044.
English language Abstract of JP2001-283894.
English language Abstract of JP 07-134984.
English language Abstract of JP 09-283178.
English language Abstract of JP 2001-143762.

* cited by examiner

BATTERY AND METHOD FOR MANUFACTURING SPIRAL ELECTRODE GROUP FOR USE THEREIN

TECHNICAL FIELD

The present invention relates to a battery formed of a wound electrode group accommodated in a battery case, and a suitable method of manufacturing the wound electrode group for use in this battery with good productivity.

BACKGROUND ART

Electrical equipment such as audio-visual equipment or PCs and mobile communication devices have rapidly become portable and cordless in recent years. Aqueous electrolyte batteries such as nickel cadmium or nickel metal hydride batteries have been mainly used as the drive power source of these electrical equipment in the past, but these batteries have been replaced recently by non-aqueous electrolyte batteries, typically represented by lithium rechargeable batteries that can be charged rapidly and have high volume/weight energy densities. The nickel cadmium or nickel metal hydride batteries, on the other hand, are being more and more specifically used for power tools or electric vehicles that need a drive power source with high load characteristics.

The trend in the non-aqueous electrolyte battery systems is towards a prismatic design because it can achieve high energy density, excellent load characteristics, and high space utilization, and is advantageous in making the equipment thinner. Furthermore, these batteries must meet the demands for higher voltage and capacity, as the portable electrical equipment have more and more advanced performance and functionality. Electrode assemblies conventionally used in prismatic batteries are mostly laminated types, having strips of stacked positive and negative electrode plates with separators interposed therebetween, and they have relatively low heavy load characteristics and cannot accept a rapid charge because of the small electrode reaction area. Accordingly, to meet the above demands, non-aqueous electrolyte batteries constructed with wound electrode assemblies of a prismatic shape have widely been used, in which laminated positive and negative electrode plates, and separators therebetween, are wound around. This prismatic wound electrode group has a construction in which a large number of positive and negative electrode plates are laminated when viewed in a longitudinal cross section, and thus can achieve large electrode reaction area.

The above wound electrode group of prismatic shape is manufactured by winding positive and negative electrode plates around a core that has a circular or elliptic cross section, and by compressing the wound assembly so that its circular or elliptic cross section becomes prismatic; with this method, however, the electrodes are often misaligned or brought out of contact near bent portions on the inside, whereby the electrode reaction is made uneven, leading to deterioration or variation of battery capacity.

For this reason, there has been a method for manufacturing a prismatic wound electrode group in which positive and negative electrode plates are wound around a flat plate core so that the wound assembly has an oblong cross section, as disclosed in Japanese Patent Laid-Open Publication No. 6-96801; or a method for manufacturing a prismatic wound electrode group in which positive and negative electrode plates are wound around a core that has substantially a rhombic cross section, and compressed so that the wound assembly has a prismatic cross section, as disclosed in Japanese Patent Laid-Open Publication No. 8-171917. In yet another prior art method for manufacturing a prismatic wound electrode group, positive and negative electrode plates are wound into a shape having a prismatic cross section and compressed with high pressure, as disclosed in Japanese Patent Laid-Open Publication No. 10-302827.

Cylindrical wound electrode assemblies used for cylindrical batteries, on the other hand, are manufactured by a method disclosed, for example, in Japanese Patent Laid-Open Publication No. 60-180071, in which, after winding positive and negative electrode plates into a shape that has a circular cross section, an adhesive tape is tightly wound around the electrodes so that the assembly has an outside diameter slightly smaller than the inside diameter of the cylindrical battery case in which it will be accommodated. When accommodating this cylindrical wound electrode group into the battery case, while it is held with a pinch tool on the outside, part of the adhesive tape and separator is cut off by a cutter and the lower part of the assembly is inserted into the case; the assembly can then be inserted into the case without removing the adhesive tape, with the electrodes loosened due to their reaction forces. Easy accommodation of the electrode group into the battery case and reduction in the risk of short circuits are thus achieved.

Japanese Patent Laid-Open Publication No. 10-64577 discloses another method for manufacturing a wound electrode group used for a cylindrical battery, in which, before winding the positive and negative electrode plates, an alkaline resistant material is attached to one or both faces of the positive electrode plate in the winding start part so as to reduce the amount of the separator to achieve a lower package ratio (ratio of battery parts other than active parts to the entire volume of the battery) and better assemblability and higher capacity, and to prevent short circuits resulting from cracks that can be formed at the end face of the positive electrode plate in the winding process.

Despite this attempt to reduce the risk of short circuits caused by cracks at the winding start in the cylindrical wound electrode group of Japanese Patent Laid-Open Publication No. 10-64577, crack-induced short circuits can still occur when the positive and negative electrode plates are thick to a certain extent, because the cross section of the wound assembly will be polygonal and not circular at the winding start. This trouble may be prevented in the cylindrical wound electrode group of Japanese Patent Laid-Open Publication No. 60-180071 by the adhesive tape tightly wound around the assembly, but the battery capacity is lowered by the use of adhesive tape because of decreased package ratio of the battery, and moreover, when inserting the assembly into the battery case, the assembly loosens more than required when part of the adhesive tape and separator is cut, creating gaps between adjacent positive and negative electrode plates, whereby the electrode reaction is made uneven, leading to deterioration or variation of battery capacity.

The recent trend in the wound electrode assemblies is towards thinner positive and negative electrode plates and separators and larger number of winding turns to achieve higher capacity so that the assemblies can be used for power tools or electric vehicles that require a drive power source with high load characteristics. In respect of achieving higher capacity, the wound electrode assemblies shown in Japanese Patent Laid-Open Publication Nos. 60-180071 and 10-64577 are not suitable because looseness exists in the assembly; the adjacent positive and negative electrode plates must be in tight contact with each other and wound around without any looseness or misalignment, as in the manufacturing methods of wound electrode assemblies shown in Japanese Patent Laid-Open Publication Nos. 6-96801, 8-171917, and 10-302827. This is because gaps between adjacent positive and negative electrode plates make the electrode reaction uneven and lead to deterioration or variation of battery capacity.

While cracks at the winding start can be reduced by retaining the tightly wound state of the assembly with adjacent positive and negative electrode plates in tight contact with each other as in the inventions disclosed in Japanese Patent Laid-Open Publication Nos. 6-96801, 8-171917, and 10-302827, there are the following problems: Firstly, the tightly wound assembly of thin positive and negative electrode plates and separators can hardly be impregnated with electrolyte in the electrolyte injecting process in the manufacture of the battery, and the charge/discharge reaction of the complete battery may become uneven and high load characteristics may be deteriorated because of the uneven impregnation of electrolyte.

Figure 9:
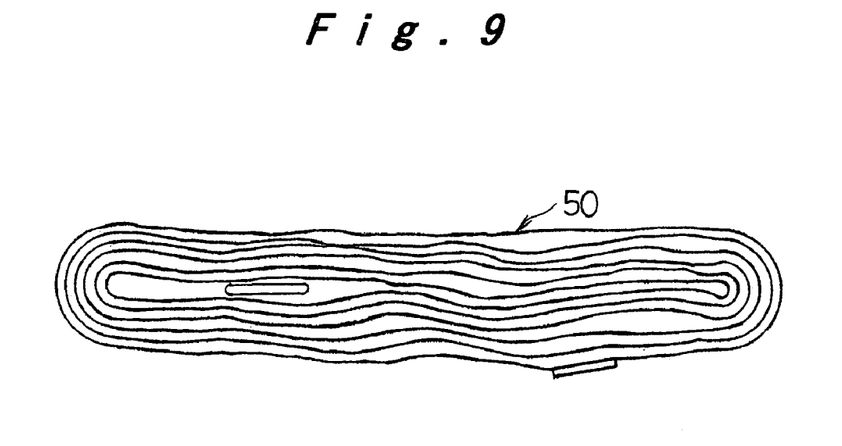
FIG. 9 is a schematic cross sectional view of a conventional prismatic wound electrode group constructed and used as a prismatic battery.

Secondly, after the prismatic wound electrode group is accommodated in the battery case with electrolyte and functions as a battery, the active materials of the positive and negative electrode plates expand due to repeated charge and discharge, because of which large buckling occurs in the linear portions between curved portions at both lengthwise ends, as shown in FIG. 9, which shows a conventional prismatic wound electrode group 50 constructed and used as a battery. While the linear portions of the oval cross section of the positive and negative electrode plates stretch along the length, the curved portions at both ends are restricted from outward expansion by the battery case and can hardly stretch; in addition, the assembly is fixed so as to remain tightly wound wherein the positive and negative electrode plates make tight contact with each other; thus the buckling in the linear portions is inevitable.

This buckling causes large gaps particularly in the center of the prismatic wound electrode group 50, whereby the positive and negative electrode plates separate from each other, making the electrode reaction uneven and lowering the charge/discharge cycle characteristics. Moreover, a buckling deformation may damage the separator and cause short circuits across the positive and negative electrode plates. Further troubles caused by the buckling include an outward bulge of the wound electrode group 50 in the central portion, abnormal deterioration of the battery because of a large deformation from the predetermined battery case dimensions, and the possibility of electrical disconnection of the battery from the battery holder case of the equipment because of the deformation of the battery case.

Figure 10:
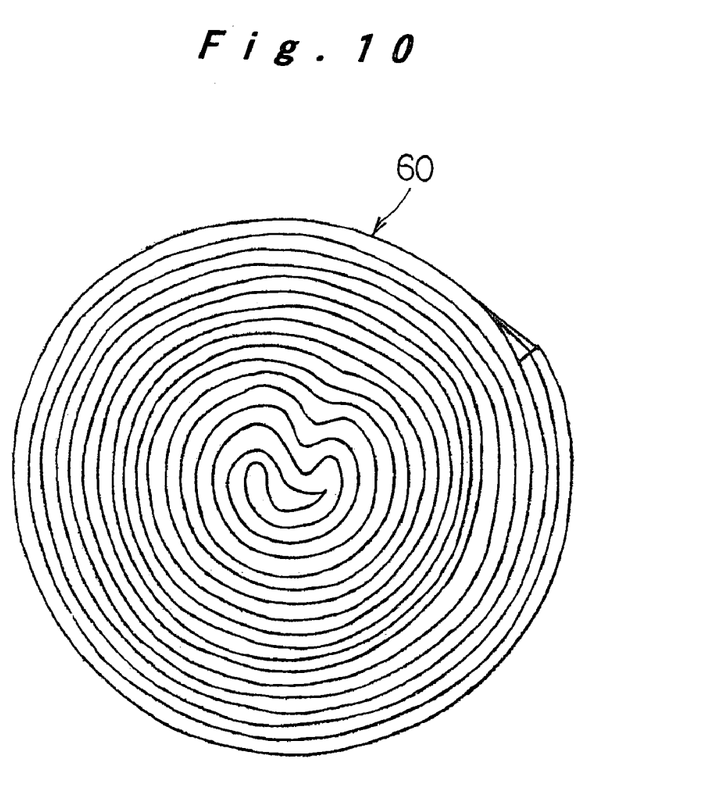
FIG. 10 is a schematic cross sectional view of a conventional cylindrical wound electrode group constructed and used as a cylindrical battery.

As for the cylindrical wound electrode assemblies, the cross section of the wound assembly can be made circular at the winding start if the positive and negative electrode plates are thin enough, but because the active materials of the positive and negative electrode plates expand due to repeated charge and discharge, an inward buckling deformation tends to occur in the central portion of the circular cross section, as shown in FIG. 10, which shows a conventional cylindrical wound electrode group 60 constructed and used as a nickel metal hydride battery. As noted above in relation to the prismatic wound electrode group 50, such buckling makes the electrode reaction uneven and causes various troubles such as deterioration of charge/discharge cycle characteristics and short circuits across the positive and negative electrode plates due to the damaged separator. The above problem found in the cylindrical wound electrode group 60 occurs also in a wound electrode group that has a substantially square cross section with four rounded corners.

The present invention has been devised in view of the above problems encountered in prior art, its object being to provide a battery having a wound electrode group which is impregnated with electrolyte swiftly and evenly while the positive and negative electrode plates and separator are tightly in contact with each other, and in which buckling is suppressed, and a suitable method for manufacturing the wound electrode group used for this battery.

DISCLOSURE OF THE INVENTION

To achieve the above object, a battery according to the present invention comprises a wound electrode group accommodated in a battery case together with electrolyte, and a sealing plate for sealing an open end of the battery case, wherein the wound electrode group is composed of an electrode stack that is formed by laminating a strip of positive electrode plate, a strip of negative electrode plate, and a pair of separators interposed therebetween so as to cover both surfaces of one of the positive and negative electrode plates, and when the electrode stack is wound around, a difference L in length between an inner turn and an adjacent outer turn satisfies $L=2t\pi+(W\times k)$, where t is a thickness of the electrode stack, W is a maximum diameter of a cross section of the wound electrode group, and k is a coefficient that is preset in accordance with expansion coefficients of active materials of the positive and negative electrode plates within a range of from 0.005 to 0.05.

Even if the wound electrode group is formed by winding a thin electrode stack, when electrolyte is poured into the battery case in the electrolyte injecting step in the manufacturing process, the electrode stack is swiftly and evenly impregnated with the electrolyte, because there is a clearance or some looseness corresponding to the difference L in the length of turns of the wound electrode group; thus uneven charge/discharge reaction is prevented and the high load characteristics of the battery is improved. After repeated charge and discharge of the battery, the positive and negative electrode plates of the wound electrode group stretch due to expansion of the active materials, but this stretch is effectively absorbed by the clearance that is designed to allow for the stretch in the assembly, so that buckling is suppressed.

The stretch may differ depending on the original length of electrode plates, but because the clearance is set in proportion to the maximum diameter W of the cross section of the wound electrode group in this battery, the stretch in each turn of the electrode plates is precisely absorbed by the clearance. Thus, after repeated charge and discharge, an ideal state is achieved in which the electrode stack forming the wound electrode group makes tight contact with each other entirely and uniformly. Therefore, charge and discharge take place uniformly over the entire assembly in this battery, whereby the charge/discharge cycle characteristics are improved, and deterioration or variation of battery capacity is prevented. Moreover, because the wound electrode group makes tight contact with the inner periphery of the battery case, the volume energy efficiency is much improved, and troubles such as short circuits across the positive and negative electrode plates caused by damaged separators are prevented. Furthermore, since the conventional problems such as deformation of the wound electrode group or deformation caused by abnormal increasing of internal pressure are resolved, there is no risk of abnormal deterioration of the battery, and its intended life is reliably secured.

Note, the maximum diameter of a cross section of the wound electrode group is the lengthwise dimension in the case with a prismatic wound electrode group, the outside diameter in the case with a cylindrical wound electrode group, and a distance between the two opposite corners in the case with a rounded prismatic wound electrode group.

In a method for manufacturing a wound electrode group according to the invention, an electrode stack is wound around a winding core to form a wound electrode group, the electrode stack is formed by laminating a strip of positive electrode plate, a strip of negative electrode plate, and a pair of separators interposed therebetween so as to cover both surfaces of one of the positive and negative electrode plates, comprising the steps of: setting a spacer having predetermined dimensions at one or a plurality of locations between two adjacent turns of the electrode stack halfway in the process of winding the electrode stack and winding them; and removing the winding cores and the spacer after fixing a winding end of the electrode stack with a fixing member after the completion of the winding process.

With this method of manufacturing a wound electrode group, a desired clearance or looseness is readily and precisely provided by properly setting the thickness of the spacer; thus, with the provision of a process of setting the spacer, the wound electrode group with a clearance is manufactured with ease and good productivity.

In the above method of manufacturing a wound electrode group according to the invention, the electrode stack is wound into the electrode group such that a difference L in the length between each one turn of two adjacent inner turn and outer turn satisfies $L=2t\pi+(W \times k)$, where t is the thickness of the electrode stack, W is the maximum diameter of a cross section of the wound electrode group to be formed by winding the electrode stack, and k is a coefficient that is preset in accordance with expansion coefficients of active materials of the positive and negative electrode plates during battery use; and the spacer should preferably have a thickness that achieves a total sum of the differences L.

Thereby, the clearance is given in an amount corresponding to the maximum diameter W of a cross section of the electrode group, which diameter changes in proportion to the stretch in the assembly, i.e., by suitably setting the thickness of the spacer, a clearance that absorbs the stretch in the electrode plates during battery use is provided precisely, irrespective of the difference in the expansion coefficient between the active materials of both electrode plates or the difference in the outer shape of the wound electrode group to be produced.

The coefficient k should preferably be selected from the range of from 0.005 to 0.05 in accordance with the number of spacers being set. Thereby, the clearance is made as small as possible to the extent that no buckling occurs in the battery, i.e., the electrode stack is made tightly in contact with each other when constructed and used as a battery. If the clearance is given with the coefficient k being equal to, or less than, 0.005, buckling occurs in the battery, and when the clearance is given with the coefficient k being equal to, or more than, 0.05, looseness becomes more than necessary, whereby the wound electrode group may deform into a volute shape when inserted into the battery case, or the clearance between the electrode stack may inhibit efficient discharge, making large current discharge impossible.

The spacer should preferably be a bar-like member having a lens-like cross section with no sharp edges. Thereby, the spacer is removed after the winding process of the wound electrode group without damaging the coating faces of the active materials on the positive and negative electrode plates. If the spacer has a circular or rectangular cross section, for example, part of the spacer makes point contact with the active material layers, and scratch lines may be formed on the active material coating faces when removing the spacer.

BEST MODE FOR CARRYING OUT THE INVENTION

Figure 1A:
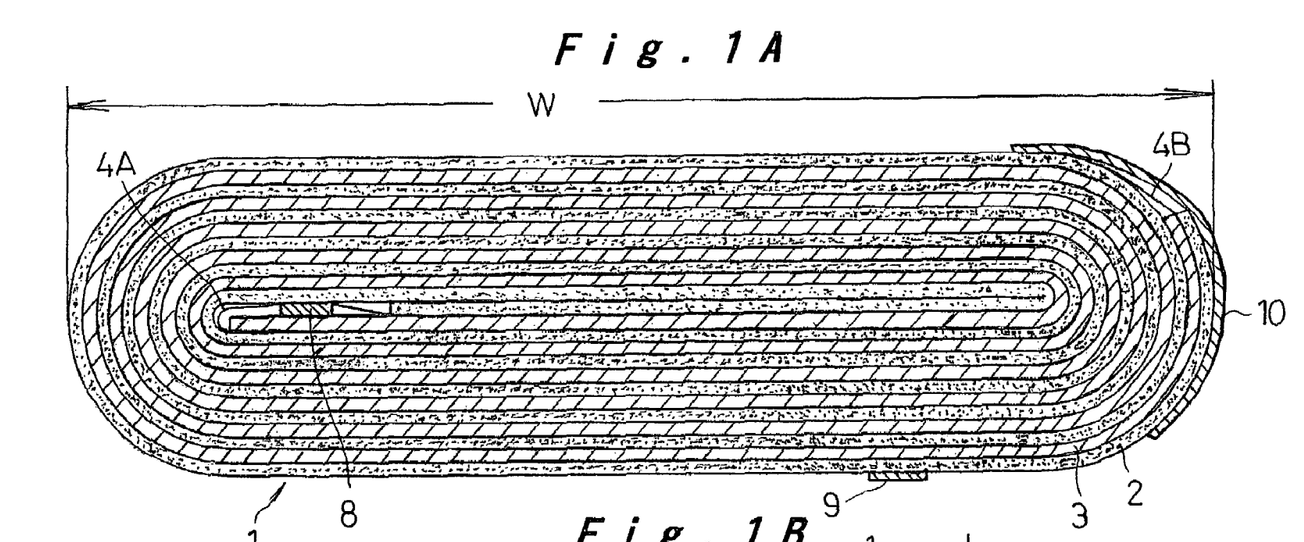
FIG. 1A is a cross sectional view of a wound electrode group used for a battery according to a first embodiment of the invention.
Figure 1B:
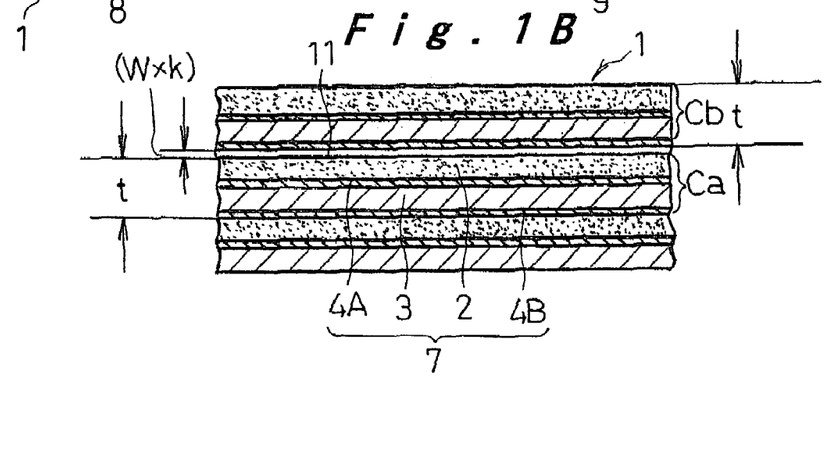
FIG. 1B is an enlarged view of part of FIG. 1A.

Preferred embodiments of the present invention will be hereinafter described with reference to the drawings. FIG. 1A is a cross sectional view of a wound electrode group 1 used for a battery according to a first embodiment of the invention, and FIG. 1B is an enlarged view of part of FIG. 1A. This embodiment shows one example of a prismatic wound electrode group 1 used for a prismatic battery. The assembly 1 consists of an electrode stack 7 including a strip of positive electrode plate 2, negative electrode plate 3, and a pair of separators 4A, 4B interposed therebetween, wound into a shape having an oval cross section as shown in FIG. 1A. The drawing shows one example of a prismatic wound electrode group 1 for a lithium rechargeable battery; leads 8, 9 are attached to the winding start of the negative electrode plate 3 and the winding end of the positive electrode plate 2, respectively. The winding end of both electrode plates 2, 3 is fixed with a fixing tape (fixing member) 10 attached thereto.

Note, FIG. 1A is a schematic representation of the structure for ease of understanding. For example, the pair of separators 4A, 4B are illustrated as straight lines. Both the positive and negative electrode plates 2, 3 are illustrated as having the same shape over the entire length for ease of illustration, although the positive electrode plate 2 is generally constructed with a strip of positive electrode core material and positive electrode active material layers formed on both surfaces thereof, sometimes one or both of them having a bared surface on one face without the active material, and the negative electrode plate 3 is generally constructed with a strip of negative electrode core material and negative electrode active material layers formed on both surfaces thereof, sometimes one or both of them having a bared surface on one face without the active material.

The characteristic feature of this prismatic wound electrode group 1 is that the electrode stack 7 comprising the positive and negative electrode plates 2, 3 and separators 4A, 4B is wound around such as to include a clearance 11 between an inner turn Ca and the adjacent outer turn Cb, as shown in FIG. 1B. Note, FIG. 1B is only a schematic illustration of the clearance 11, and although it is intended that this clearance 11 is formed when the electrode stack 7 is wound, it may partly disappear after the winding because of some looseness. The clearance 11 need only be provided at least at one location between two adjacent inner turn Ca and outer turn Cb; this will be described in detail later.

The clearance 11 is given as an allowance for stretch of the electrode stack 7 resulting from expansion of active materials of the positive and negative electrode plates 2, 3 after repeated charge and discharge of the battery in which the wound electrode group 1 is used. More specifically, the clearance 11 is given in the following manner: When winding the electrode stack 7, the difference L in the length of one turn between an inner turn Ca and the adjacent outer turn Cb is set so as to satisfy the following equation: $L=2t\pi+(W \times k)$, where t is the thickness of the electrode stack 7 including a set of positive and negative electrode plates 2, 3 and a pair of separators 4A, 4B, W is the maximum diameter of the prismatic wound electrode group 1, and k is a coefficient preset in accordance with the expansion coefficient of active materials of the positive and negative electrode plates 2, 3 when the battery is used, as shown in FIG. 1A and FIG. 1B. In this prismatic wound electrode group 1, the maximum diameter W of the cross section equals to the lengthwise width of the assembly.

If the electrode plates are tightly wound such that there is no gap anywhere between adjacent inner turn and outer turn as in the conventional wound electrode group 50 shown in FIG. 9, the above difference L equals to $2t\pi$; thus, as is clear from the above equation, the clearance 11 is determined by the maximum diameter W of electrode group 1 to be produced, multiplied by the coefficient k ($W \times k$) that is a function of the expansion coefficient of the active materials of the positive and negative electrode plates 2, 3 and the properties of their core materials. Therefore, the clearance 11 is set in proportion to the maximum diameter W, because the amount of stretch in the electrode stack 7 increases as the maximum diameter W is made larger. In other words, the clearance 11 is set so that it absorbs the stretch of positive and negative electrode plates 2, 3 precisely when used as the battery, irrespective of the difference in the expansion coefficient between the active materials of both electrode plates 2, 3, or, the difference in the maximum diameter W of the electrode group 1 to be produced.

The coefficient k should preferably be set in a range of from 0.005 to 0.05. By setting the coefficient k within this range, the clearance 11 is made as small as possible to the extent that no buckling occurs in the battery, i.e., the positive and negative electrode plates 2, 3 and separators 4A, 4B are made tightly in contact with each other when they function as a battery. This has been ascertained from measurement results of the actual length of stretch in the positive and negative electrode plates 2, 3 when used as a battery. For example, when the clearance 11 was given with the coefficient k being equal to, or less than, 0.005, buckling occurred in the battery, and when the clearance 11 was given with the coefficient k being equal to, or more than, 0.05, looseness in the assembly was more than necessary, whereby the wound electrode group deformed into a volute shape when inserted into the battery case, or the clearances between the positive and negative electrode plates 2, 3 and separators 4A, 4B inhibited efficient discharge, making large current discharge impossible.

As is clear from the above description, even if the positive and negative electrode plates and the separators are made thinner for higher capacity, they are wound with a clearance 11 or some looseness by the amount of the clearance 11 that is determined by the difference L in the length of turns, so that when electrolyte is poured into the battery case accommodating this prismatic wound electrode group 1 in the electrolyte injecting process in the manufacture of the prismatic battery, the electrode plates 2, 3 and the separators 4A, 4B are swiftly and evenly impregnated with the electrolyte; thus with the above electrode group 1, uneven charge/discharge reaction is prevented and a prismatic battery with higher load characteristics can be obtained reliably.

The clearance 11 or looseness exists in the above prismatic battery when it is not used; after charge and discharge of the battery have been repeated several times, the positive and negative electrode plates 2, 3 stretch because of expansion of the active materials; the clearance 11 or looseness is designed precisely as an allowance for this stretch, whereby not only buckling is suppressed but also an ideal state is achieved wherein the electrode plates 2, 3 and the separators 4A, 4B make tight contact with each other entirely and uniformly.

Figure 2:
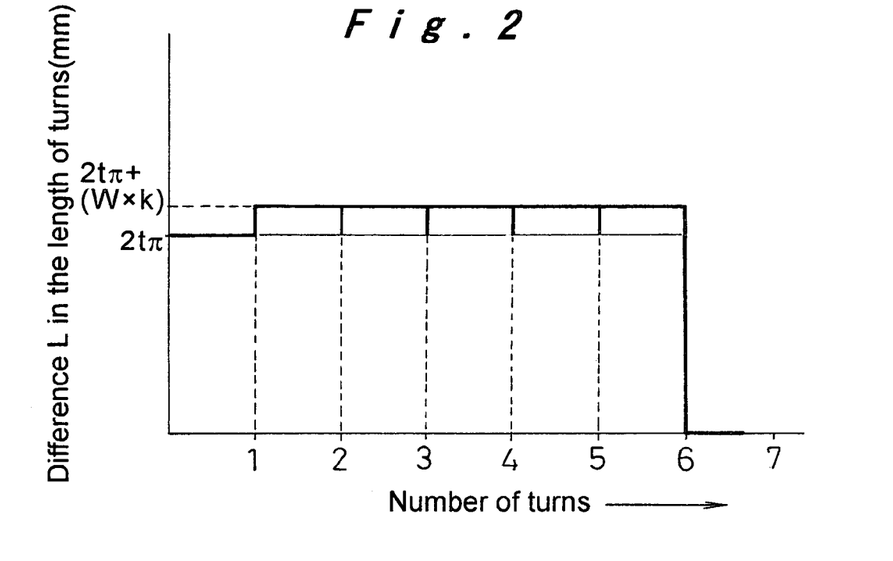
FIG. 2 is a graph showing one example of the relationship between the number of turns and the difference in the length between two adjacent turns of the above wound electrode group.
Figure 3:
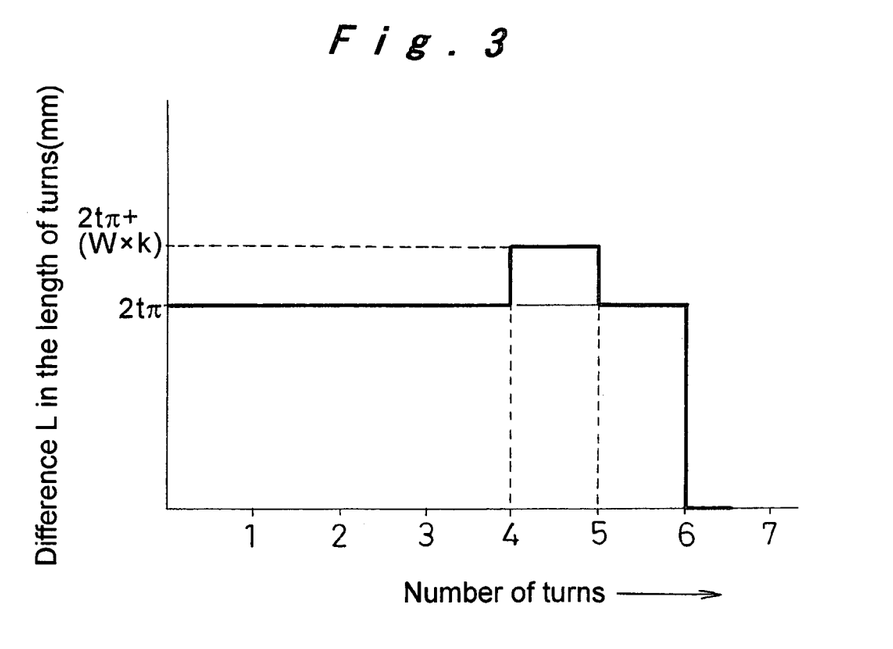
FIG. 3 is a graph showing another example of the relationship between the number of turns and the difference in the length between two adjacent turns of the above wound electrode group.

The clearance 11 should optimally be provided between each two adjacent turns as shown in the graph of FIG. 2, but this will only be achieved through an elaborate process. However, it has been ascertained from measurement results that the above effects are achieved by providing the clearance 11 at only one location as shown in the graph of FIG. 3. When the clearance 11 is given at one location, the coefficient k must obviously be large within the range of 0.005 to 0.05. Furthermore, when giving the clearance 11 at only one location, the difference $2t\pi+(W \times k)$ in the length of turns between two adjacent turns in FIG. 3 must obviously be the sum of the differences $2t\pi+(W \times k)$ in the length of turns between each two adjacent turns in FIG. 2.

Measurement results showed that, in a wound electrode group 1 with the maximum diameter W of 32 mm and coefficient k of 0.0125, a clearance of 0.4 mm ($32 \times 0.0125$) provided at one location between the outermost turn and inner turn was enough to prevent buckling caused by stretch of positive and negative electrode plates 2, 3 and to cause the electrode plates 2, 3 and separators 4A, 4B to make tight contact with each other entirely and uniformly.

It was also ascertained that the above favorable results were reliably obtained even when the prismatic wound electrode group 1 is constructed with very thin electrodes 2, 3 and separators 4A, 4B. The actual measurements were as follows: an electrode stack 7 formed by a positive electrode plate 2 consisting of a core material of 15 µm thick aluminum foil and active material layers on both sides thereof, a negative electrode plate 3 consisting of a core material of 10 µm thick copper foil and active material layers on both sides thereof, and separators 4A, 4B made of 20±2 µm polyethylene film were wound around with the above clearance 11 to obtain a prismatic wound electrode group 1 used for a prismatic lithium rechargeable battery having a 6.3 mm shorter side, 34 mm longer side, and 50 mm height. It was ascertained that the positive and negative electrode plates 2, 3 and the separators 4A, 4B were swiftly and uniformly impregnated with electrolyte in the electrolyte injection process and no buckling occurred in the battery using this electrode group 1.

Figure 4:
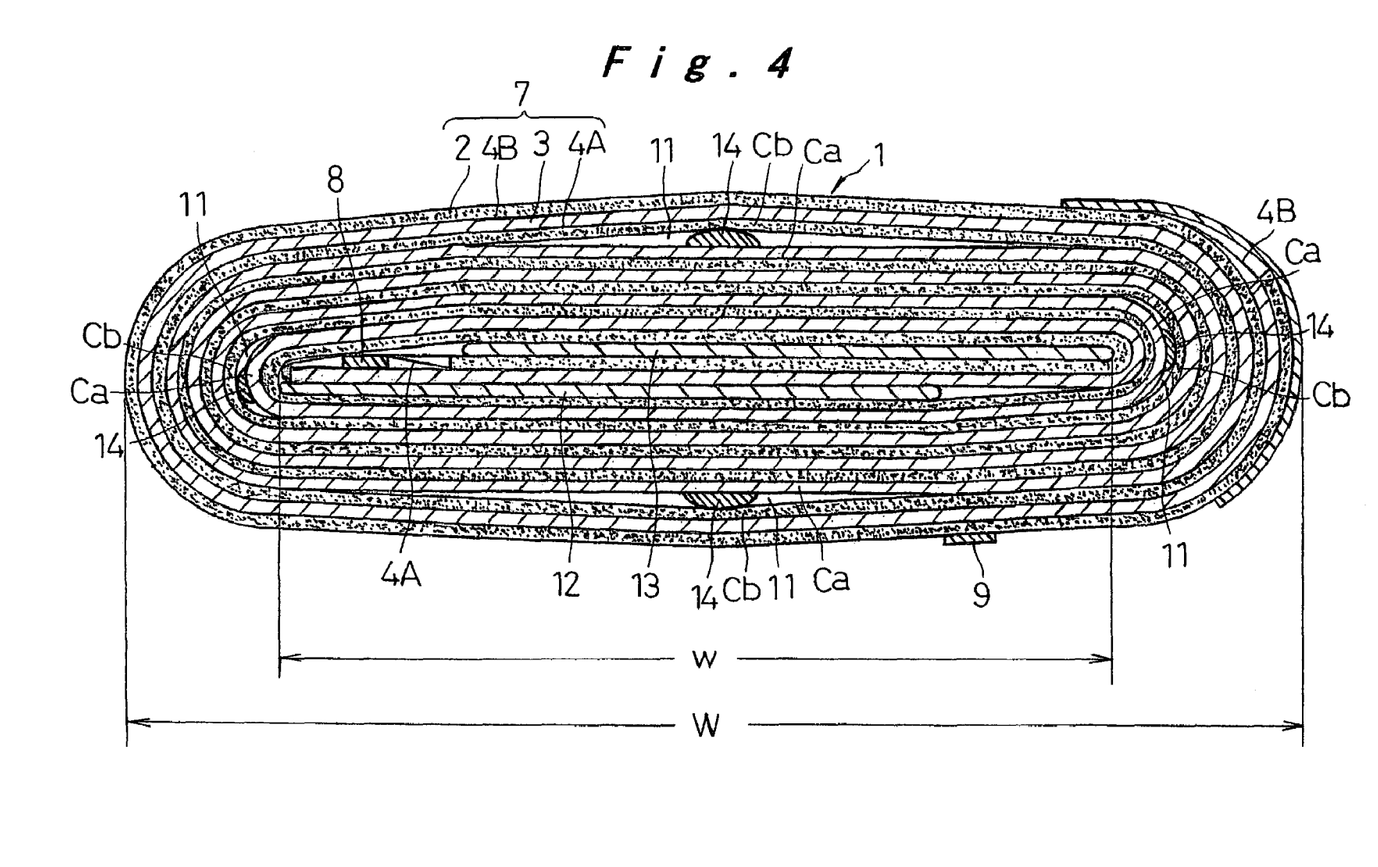
FIG. 4 is a cross sectional view of the wound electrode group in a state after a winding process of the manufacturing method for the electrode group of the same embodiment.

Next, a method for manufacturing the above prismatic wound electrode group 1 will be described. FIG. 4 is a cross sectional view of a prismatic wound electrode group 1 after the completion of a winding process in the method for manufacturing the above electrode group 1; the elements that are identical or similar to those of FIG. 1 are given the same reference numerals. The method starts with a winding process: Strips of positive and negative electrode plates 2, 3 and a pair of separators 4A, 4B interposed therebetween are laminated to form an electrode stack 7; the stack is fixed at a portion one half turn from the winding start with a pair of flat winding cores 12, 13 from both sides; the cores 12, 13 are then rotated with their relative positions maintained, so that the electrode stack 7 is wound around the cores 12, 13.

Here, the pair of winding cores 12, 13 are offset from each other a certain distance, and the distance between their respective outer ends determines the length w of the innermost linear portion of the wound electrode group 1 to be produced. The length w of this linear portion is constant irrespective of the number of turns of the electrode stack 7. On the other hand, while the length w of the linear portion is constant, the maximum diameter W or the lengthwise width of the wound electrode group 1 changes in proportion to the number of turns of the electrode stack 7.

In the above winding process, the electrode stack 7 is wound around with spacers 14 having a predetermined thickness interposed at least at one location between two adjacent turns. The spacers 14 have such a thickness that the difference L in the length between one turn of an inner turn Ca and that of an outer turn Cb of the electrode stack 7 where the spacers 14 are located equals to 2tπ+(W×k), as noted above. The winding operation is paused when setting the spacers 14.

This embodiment shows one example in which spacers 14 are set at four locations, two in the lengthwise center opposite each other and another two in the center of both curved ends opposite each other, so that four clearances 11 are formed. The clearance 11 need only be provided somewhere at one location as mentioned above; it should preferably be provided at one of these lengthwise centers or the centers of the curved ends, so as to suppress misalignment in the winding of the electrode stack 7 and facilitate the winding.

When the winding process is finished, a fixing tape 10 is attached to the winding end of the electrode stack 7 to retain the wound shape. Then, the winding cores 12, 13 and spacers 14 are removed. The prismatic wound electrode group 1 obtained through this winding process will then undergo pressing in which pressure is applied in the direction of thickness of the oval cross sectional shape so that the clearances 11 that are present in the linear portions are moved towards the curved portions by the pressure, whereby the clearances 11 are always located at the curved portions after the pressing. Therefore, the stretch in the linear portions of the electrode plates caused by charge and discharge during the use of the battery is effectively absorbed by the clearances at the curved portions, and buckling is effectively prevented.

With the above manufacturing method, desired clearances 11 or looseness in the prismatic wound electrode group 1 shown in FIG. 1A and FIG. 1B are readily and precisely provided by suitably setting the thickness of the spacers 14; with the provision of a simple process of setting the spacers 14, the prismatic wound electrode group 1 shown in FIG. 1A and FIG. 1B is manufactured with ease and good productivity.

The spacers 14 used here are bar-like members having a lens-like cross section with no sharp edges as shown in FIG. 4, so that they are removed after the winding process of the electrode group 1 without damaging the coating faces of the active materials on the positive and negative electrode plates 2, 3. If the spacers have a circular or rectangular cross section, for example, part of the spacers makes point contact with the active material layers, and scratch lines may be formed on the active material coating faces when removing the spacers.

Figure 5:
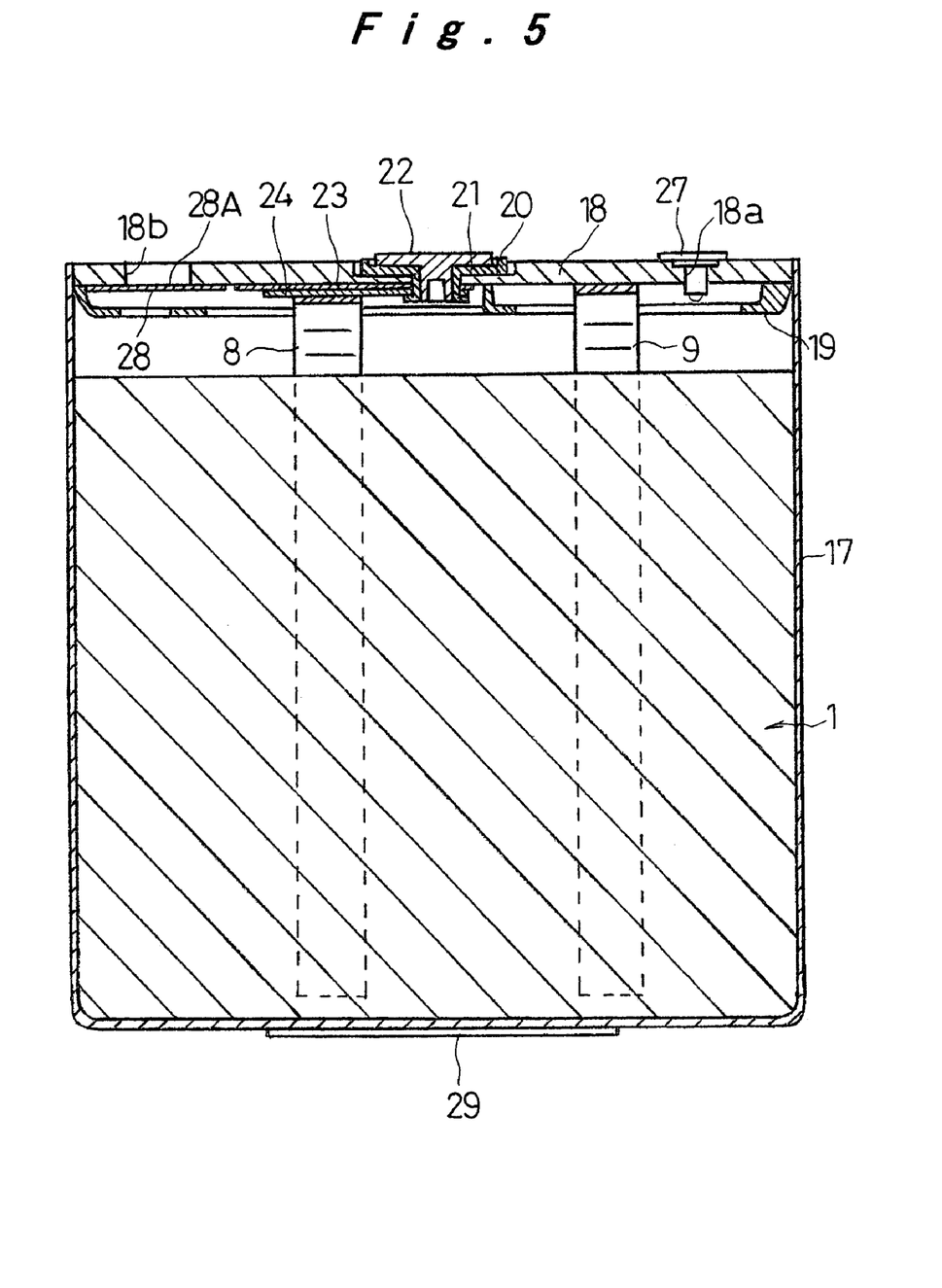
FIG. 5 is a longitudinal cross sectional view of a battery according to the first embodiment of the invention using the above wound electrode group.
Figure 6:
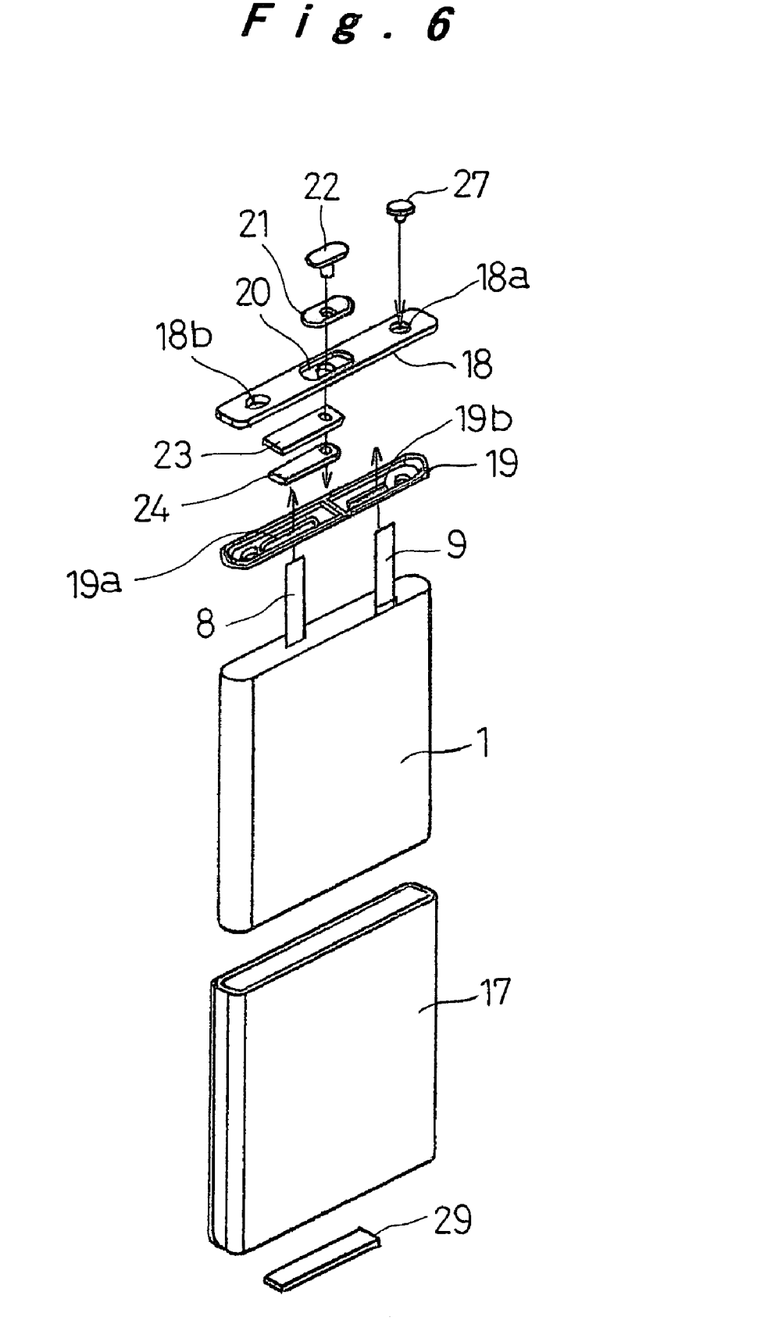
FIG. 6 is an exploded perspective view of the above battery.

FIG. 5 is a longitudinal cross sectional view of a prismatic battery according to a first embodiment of the invention using the above wound electrode group 1, and FIG. 6 is an exploded perspective view of this prismatic battery. The battery includes a bottomed, square tube battery case 17 having an oval cross section for accommodating the prismatic wound electrode group 1 produced as described above, and a sealing plate 18 for sealing the open end of the case 17. More specifically, a frame 19 supporting the sealing plate 18 is fitted in a portion near the open end of the case 17, and the sealing plate 18 is placed on top of the frame 19 and welded to the periphery of the open end of the case 17, to seal the case 17.

An upper insulating gasket 21 is fitted into a recess 20 at the center of the sealing plate 18, and a nickel-plated iron rivet that forms the negative terminal 22 is passed through respective holes in the upper insulating gasket 21 and sealing plate 18 such that it is electrically insulated from the sealing plate 18, with the upper insulating gasket 21 interposed therebetween. The bottom end of the negative terminal 22 that has passed through the upper insulating gasket 21 and sealing plate 18 further passes through respective mounting holes in a lower insulating gasket 23 and a negative terminal plate 24, and is riveted. Thereby, the negative terminal plate 24 is electrically insulated from the sealing plate 18 by the lower insulating gasket 23 interposed therebetween, and electrically connected to the negative terminal 22 through the caulked portion of the terminal 22. A negative electrode lead 8 and a positive electrode lead 9 extending from the prismatic wound electrode group 1 are passed through apertures 19a, 19b in the frame 19 and welded to the negative terminal plate 24 and sealing plate 18, respectively.

When assembling, the sealing plate 18 is fitted onto the open end of the battery case 17 and welded thereto after the upper and lower insulating gaskets 21, 23 and negative terminal plate 24 are fixedly set by the negative terminal 22. Electrolyte (not shown) is then poured into the case 17 through a hole 18a in the sealing plate 18. The positive and negative electrode plates 2, 3 and separators 4A, 4B are swiftly and uniformly impregnated with the electrolyte as it is poured into the case 17 because of the clearance 11 or looseness corresponding to the difference L in the length of turns of the prismatic wound electrode group 1. The hole 18a is closed with a plug 27 after the injection of the electrolyte.

In the sealing plate 18 is formed a safety vent aperture 18b at the opposite end from the hole 18a, which aperture 18b is closed by an aluminum thin film 28 attached to the underside of the sealing plate 18 by a cladding process. The portion of the aluminum thin film 28 closing the aperture 18b forms a safety vent 28A that breaks upon an increasing of internal pressure of the battery for releasing gas to the outside. To the lower face of the bottom wall of the battery case 17 is welded a positive terminal 29. Thus, the case 17 constitutes the positive electrode and the rivet or the negative terminal 22 constitutes the negative electrode in this prismatic battery.

In this prismatic battery, before use, a clearance 11 or looseness exists at least in one of the curved portions on both sides of the wound electrode group 1. After repeated charge and discharge of the battery, the positive and negative electrode plates 2, 3 of the assembly 1 stretch due to expansion of the active materials. This stretch in the linear portions of the electrode plates 2, 3 is effectively absorbed by the clearance 11 or looseness that is designed precisely to allow for the stretch and provided in the curved portion, so that no buckling occurs in this electrode group 1 and an ideal state is achieved in which the positive and negative electrode plates 2, 3 and separators 4A, 4B are entirely and uniformly in tight contact with each other.

Because no buckling occurs and the electrode plates 2, 3 and separators 4A, 4B make tight contact with each other entirely and uniformly in the electrode group 1 during use, charge and discharge take place evenly over the entire electrode group 1, whereby the prismatic battery has improved charge/discharge cycle characteristics, and there is no risk of deterioration or variation of battery capacity.

Moreover, because no buckling occurs, the prismatic wound electrode group 1 makes tight contact with the inner periphery of the battery case 17, whereby the volume energy efficiency is much improved, and troubles such as short circuits across the electrodes 2, 3 caused by damaged separators or uneven absorption of gas will not occur. Also, since the conventional problems such as deformation of the electrode group 1 or deformation caused by abnormal increasing of internal pressure are resolved, there is no risk of abnormal deterioration of the battery, and its intended life is reliably secured.

Figure 7A:
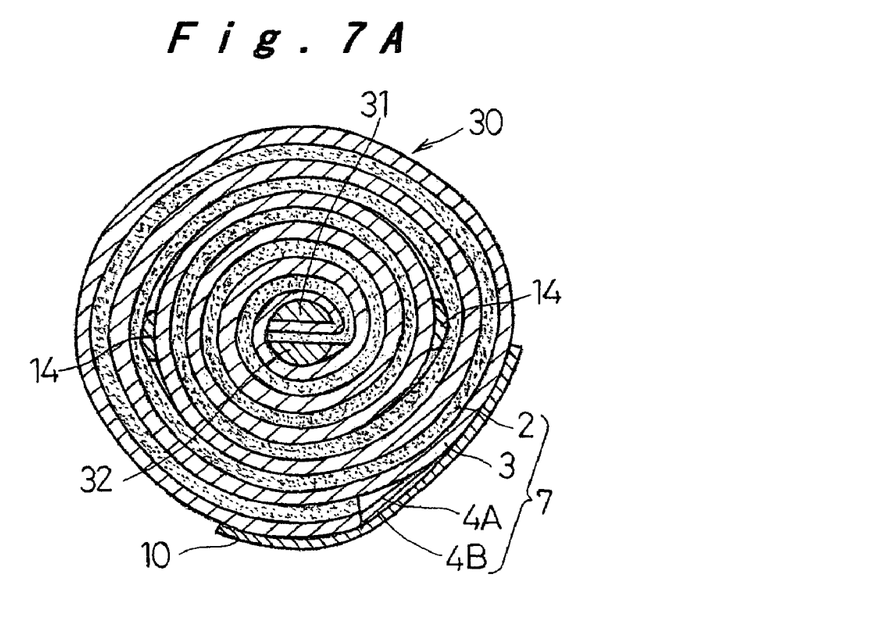
FIG. 7A is a cross sectional view of a wound electrode group used for the battery according to a second embodiment of the invention, in a state after a winding process of the manufacturing method for the assembly.
Figure 7B:
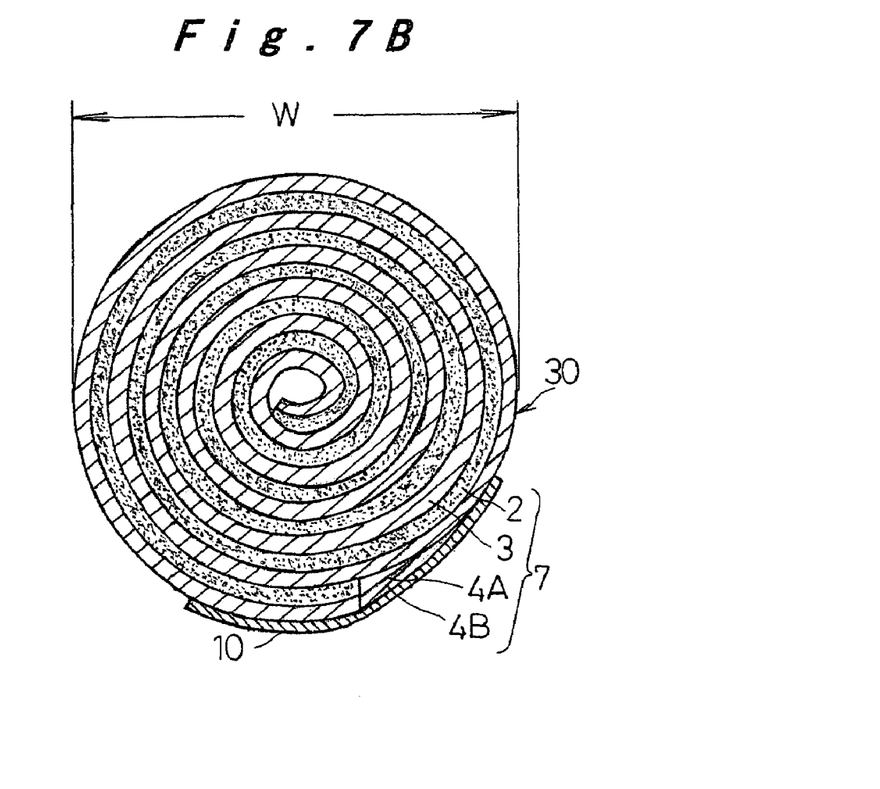
FIG. 7B is a cross sectional view of the assembly constructed and used as the battery.

FIG. 7A is a cross sectional view of a wound electrode group 30 used for the battery according to a second embodiment of the invention, in a state after a winding process in the manufacturing method of the assembly, and FIG. 7B is a cross sectional view of the assembly 30 constructed and used as the battery. This embodiment shows one example of a cylindrical wound electrode group 30 having a circular cross section used for a cylindrical battery; elements corresponding to those shown in FIG. 1A, FIG. 1B, and FIG. 4 are given the same reference numerals in FIG. 7A and FIG. 7B. Also, FIG. 7A and FIG. 7B are schematic representations as with FIG. 1A, FIG. 1B and FIG. 4 for ease of understanding of the structure.

Manufacturing of the cylindrical wound electrode group 30 starts with a winding process: Strips of positive and negative electrode plates 2, 3 and a pair of separators 4A, 4B interposed therebetween are laminated to form an electrode stack 7; the stack is fixed at a portion one half turn from the winding start with a pair of winding cores 31, 32 that have a substantially semi-circular cross section from both sides; the cores 31, 32 are then rotated with their relative positions maintained, so that the electrode stack 7 is wound around the cores 31, 32.

In the above winding process, the electrode stack 7 is wound around with spacers 14 having a predetermined thickness interposed at least at one location between two adjacent turns. Similarly to the first embodiment, the spacers 14 have such a thickness that the difference L in the length between one turn of the inner turn and that of the outer turn of the electrode stack 7 where the spacers 14 are located equals to 2tπ+(W×k). Similarly to the first embodiment, t represents the thickness of the electrode stack 7, k is a coefficient, and W is a maximum diameter. The maximum diameter W here is the outside diameter of the cylindrical wound electrode group 30 as shown in FIG. 7B. This embodiment shows one example in which spacers 14 are set at two radially opposite locations. When the winding process is finished, a fixing tape (fixing member) 10 is attached to the winding end of the electrode stack 7 to retain the wound shape. Then, the winding cores 31, 32 and spacers 14 are removed, to obtain the cylindrical wound electrode group 30 shown in FIG. 7B.

With this manufacturing method, similarly to the first embodiment, with the provision of a simple process of setting the spacers 14, the cylindrical wound electrode group 30 having a preset clearance or looseness is manufactured with ease and good productivity. Also, because the spacers 14 used here are bar-like members having a lens-like cross section with no sharp edges, they are removed after the winding process of the electrode group 30 without damaging the active material coating faces of the positive and negative electrode plates 2, 3 as shown in FIG. 7B.

Even if the electrode plates 2, 3 and separators 4A, 4B are made thinner for higher capacity, they are wound with a clearance or some looseness corresponding to the thickness of the spacers 14 or the difference L in the length of turns, so that when electrolyte is poured into the battery case accommodating this cylindrical wound electrode group 30 in the electrolyte injecting process in the manufacture of the cylindrical battery, the positive and negative electrode plates 2, 3 and the separators 4A, 4B are swiftly and evenly impregnated with the electrolyte; thus with the above cylindrical wound electrode group 30, uneven charge/discharge reaction is prevented and a cylindrical battery with improved high load characteristics is obtained reliably.

In this cylindrical battery, before use, a clearance or looseness exists as noted above; after repeated charge and discharge of the battery, the positive and negative electrode plates 2, 3 stretch due to expansion of the active materials, and because the clearance or looseness is designed precisely to allow for this stretch, no buckling occurs as shown in FIG. 7B, and an ideal state is achieved in which the positive and negative electrode plates 2, 3 and separators 4A, 4B are entirely and uniformly in tight contact with each other.

Because no buckling occurs and the positive and negative electrode plates 2, 3 and the separators 4A, 4B make tight contact with each other entirely and uniformly in the cylindrical wound electrode group 30 during use, charge and discharge take place evenly over the entire electrode group 30, whereby the above cylindrical battery has improved charge/discharge cycle characteristics, and there is no risk of deterioration or variation of battery capacity.

It was ascertained that the above favorable results were reliably obtained even when the cylindrical wound electrode group 30 is constructed with very thin positive and negative electrode plates 2, 3 and separators 4A, 4B. The actual measurements were as follows: an electrode stack 7 formed by a 178 μm thick positive electrode plate 2, a 206 μm thick negative electrode plate 3, and 59.5±0.5 μm thick separators 4A, 4B was wound around with the above clearance to obtain a cylindrical wound electrode group 30 used for a cylindrical nickel metal hydride battery. It was ascertained that the electrode plates 2, 3 and the separators 4A, 4B were swiftly and uniformly impregnated with electrolyte in the electrolyte injection process and no buckling occurred during use as the cylindrical battery using this electrode group 30.

Figure 8A:
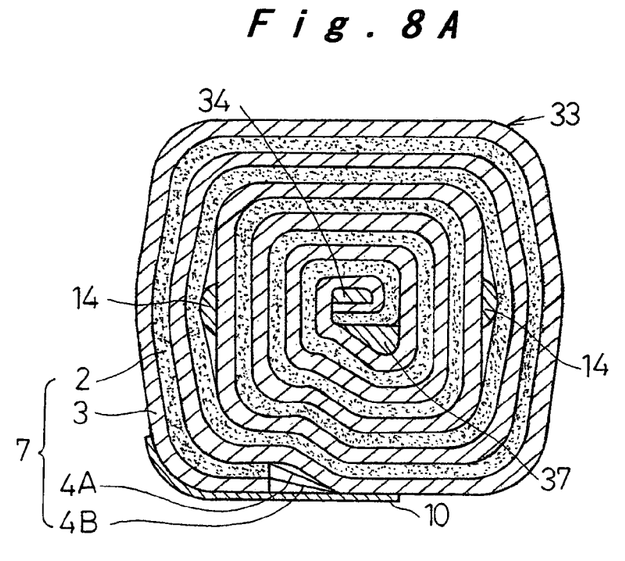
FIG. 8A is a cross sectional view of a wound electrode group used for the battery according to a third embodiment of the invention, in a state after a winding process of the manufacturing method for the assembly.
Figure 8B:
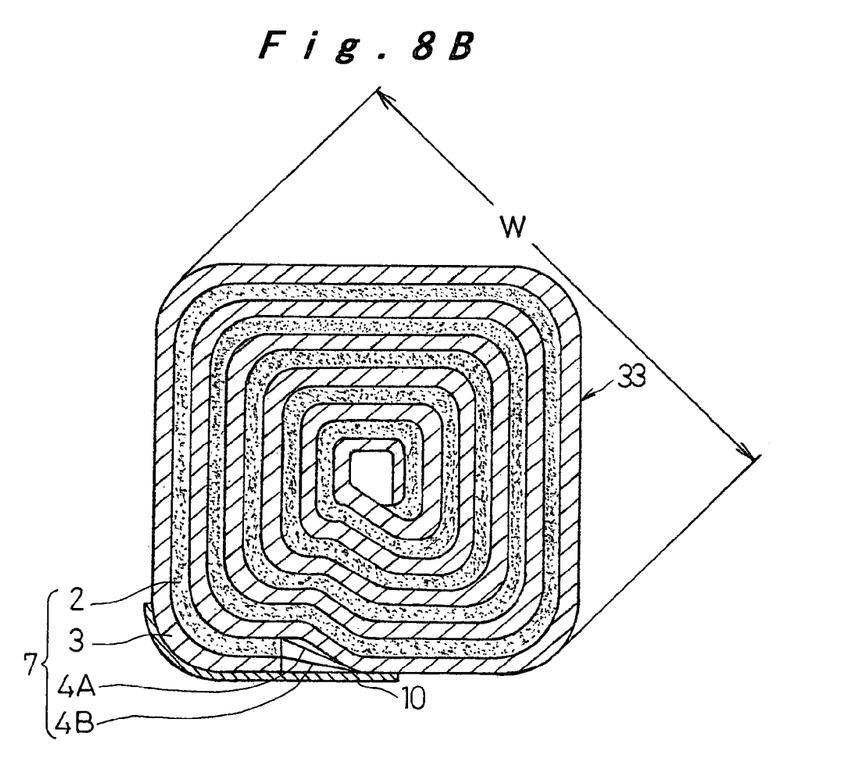
FIG. 8B is a cross sectional view of the assembly constructed and used as the battery.

FIG. 8A is a cross sectional view of a wound electrode group 33 used for the battery according to a third embodiment of the invention, in a state after a winding process in the manufacturing method of the assembly, and FIG. 8B is a cross sectional view of the assembly 33 constructed and used as the battery. This embodiment shows one example of a rounded prismatic wound electrode group 33 having a substantially square cross section with four rounded corners, used for a rounded prismatic battery; elements corresponding to those shown in FIG. 1A, FIG. 1B, and FIG. 4 are given the same reference numerals in FIG. 8A and FIG. 8B. Also, FIG. 8A and FIG. 8B are schematic representations as with FIG. 1A, FIG. 1B and FIG. 4 for ease of understanding of the structure.

Manufacturing of the rounded prismatic wound electrode group 33 starts with a winding process: Strips of positive and negative electrode plates 2, 3 and a pair of separators 4A, 4B interposed therebetween are laminated to form an electrode stack 7; the stack is fixed at a portion one half turn from the winding start with a pair of winding cores 34, 37 from both sides; the cores 34, 37 are then rotated with their relative positions maintained, so that the electrode stack 7 is wound around the cores 34, 37.

In the above winding process, the electrode stack 7 is wound around with spacers 14 having a predetermined thickness interposed at least at one location between two adjacent turns. Similarly to the first embodiment, the spacers 14 have such a thickness that the difference L in the length between one turn of the inner turn and that of the outer turn of the electrode stack 7 where the spacers 14 are located equals to $2t\pi+(W\times k)$. Similarly to the first embodiment, t represents the thickness of the electrode stack 7, k is a coefficient, and W is a maximum diameter. However, the maximum diameter W here is a distance between the two opposite corners of the rounded prismatic wound electrode group 33 as shown in FIG. 8B. This embodiment shows one example in which spacers 14 are set at two opposite locations in the center. When the winding process is finished, a fixing tape (fixing member) 10 is attached to the winding end of the electrode stack 7 to retain the wound shape. Then, the winding cores 34, 37 and spacers 14 are removed, to obtain the rounded prismatic wound electrode group 33 shown in FIG. 8B.

With this manufacturing method, similarly to the first embodiment, with the provision of a simple process of setting the spacers 14, the rounded prismatic wound electrode group 33 having a preset clearance or looseness is manufactured with ease and good productivity. Also, because the spacers 14 used here are bar-like members having a lens-like cross section with no sharp edges, they are removed after the winding process of the electrode group 33 without damaging the active material coating faces of the positive and negative electrode plates 2, 3 as shown in FIG. 8B.

Even if the electrode plates 2, 3 and the separators 4A, 4B are made thinner for higher capacity, they are wound with a clearance or some looseness corresponding to the thickness of the spacers 14 or the difference L in the length of turns, so that when electrolyte is poured into the battery case accommodating this rounded prismatic wound electrode group 33 in the electrolyte injecting process in the manufacture of the rounded prismatic battery, the electrode plates 2, 3 and the separators 4A, 4B are swiftly and evenly impregnated with the electrolyte. Thus, with the above rounded prismatic wound electrode group 33, uneven charge/discharge reaction is prevented and a rounded prismatic battery with improved high load characteristics is obtained reliably.

In this rounded prismatic battery, before use, a clearance or looseness exists as noted above. After repeated charge and discharge of the battery, the positive and negative electrode plates 2, 3 stretch due to expansion of the active materials. Because the clearance or looseness is designed precisely to allow for this stretch, buckling is suppressed as shown in FIG. 8B, and an ideal state is achieved in which the positive and negative electrode plates 2, 3 and the separators 4A, 4B are entirely and uniformly in tight contact with each other.

INDUSTRIAL APPLICABILITY

According to the invention, the clearance or looseness that exists in the wound electrode group helps swift and uniform impregnation of electrolyte between the positive and negative electrode plates and the separators, whereby uneven charge and discharge reaction is prevented and high load characteristics of the battery is improved; also, buckling of the electrode group is suppressed, because the stretch in the electrode plates due to repeated charge and discharge is absorbed by the above clearance.

In the battery according to the invention, as the stretch in each turn of the wound electrode group is precisely absorbed by the clearance and charge and discharge are repeated, an ideal state is achieved wherein the positive and negative electrode plates and the separators make tight contact with each other entirely and uniformly, whereby charge and discharge take place uniformly over the entire assembly; thus the charge/discharge cycle characteristics is improved, and deterioration or variation of battery capacity is prevented. Moreover, according to the invention, because the wound electrode group makes tight contact with the inner periphery of the battery case, the volume energy efficiency is much improved, and troubles such as short circuits across the electrode plates caused by damaged separators are prevented.

Furthermore, according to the invention, since the conventional problems such as deformation of the wound electrode group or deformation of battery case caused by abnormal increasing of internal pressure are resolved, there is no risk of abnormal deterioration of the battery, and its intended life is reliably secured.

According to the method of manufacturing the wound electrode group used for the battery of the invention, a desired clearance or looseness is readily and precisely provided by properly setting the thickness of spacers; thus, with the provision of a process of setting the spacers, the wound electrode group with a clearance can be manufactured with ease and good productivity.

The invention claimed is:

1. A battery comprising a wound electrode group accommodated in a battery case together with electrolyte, and a sealing plate that is configured to seal an open end of the battery case, wherein
    the wound electrode group comprises an electrode stack that includes a lamination of a strip of positive electrode plate, a strip of negative electrode plate, and a pair of separators interposed therebetween so as to cover both surfaces of one of the positive and negative electrode plates, and
    when the electrode stack is wound, a difference L in length between an inner turn and an adjacent outer turn satisfies $L=2t\pi+(W\times k)$, where t is a thickness of the electrode stack, W is a maximum diameter of a cross section of the wound electrode group, and k is a coefficient that is preset in accordance with expansion coefficients of active materials of the positive and negative electrode plates and is within a range from 0.005 to 0.05.

2. The battery according to claim 1, wherein the difference L in length between the inner turn and the adjacent outer turn causes a clearance to exist between the inner turn and the adjacent outer turn.

3. A method for manufacturing a wound electrode group wherein an electrode stack is wound around winding cores to form a wound electrode group, the electrode stack being formed by laminating a strip of positive electrode plate, a strip of negative electrode plate, and a pair of separators interposed therebetween so as to cover both surfaces of one of the positive and negative electrode plates, the method comprising:
    setting a spacer having predetermined dimensions at one or a plurality of locations between two adjacent turns of the electrode stack halfway in the process of winding the electrode stack and winding them, and
    removing the winding cores and the spacer after fixing a winding end of the electrode stack with a fixing member after the completion of the winding process, wherein the electrode stack is wound into the electrode group such that a difference L in length between each turn of two adjacent inner and outer turns satisfies L=2tπ+(W×k), where t is a thickness of the electrode stack, W is a maximum diameter of a cross section of the wound electrode group to be formed by winding the electrode stack, and k is a coefficient that is preset in accordance with expansion coefficients of active materials of the positive and negative electrode plates during battery use; and the spacer has a thickness that achieves a total sum of the differences L.

4. The method for manufacturing a wound electrode group according to claim 3, wherein the coefficient k is selected from a range from 0.005 to 0.05 in accordance with the number of the spacers being set.

5. The method for manufacturing a wound electrode group according to claim 4, wherein the spacer is a bar-like member having a lens-like cross section with no sharp edges.

6. The method for manufacturing a wound electrode group according to claim 3, wherein the spacer is a bar-like member having a lens-like cross section with no sharp edges.

7. The method according to claim 3, wherein the spacer creates a clearance between the two adjacent turns of the electrode stack.

* * * * *